United States Patent
Schweitzer, III et al.

(10) Patent No.: US 9,581,976 B2
(45) Date of Patent: Feb. 28, 2017

(54) RECORDING OF OPERATING PARAMETERS OF AN INTELLIGENT ELECTRONIC DEVICE

(71) Applicant: Schweitzer Engineering Laboratories, Inc., Pullman, WA (US)

(72) Inventors: Edmund O Schweitzer, III, Pullman, WA (US); Ronald A. Schwartz, Pullman, WA (US); David E Whitehead, Pullman, WA (US)

(73) Assignee: SCHWEITZER ENGINEERING LABORATORIES, INC., Pullman, WA (US)

( * ) Notice: Subject to any disclaimer, the term of this patent is extended or adjusted under 35 U.S.C. 154(b) by 879 days.

(21) Appl. No.: 13/668,737

(22) Filed: Nov. 5, 2012

(65) Prior Publication Data
US 2014/0128999 A1    May 8, 2014

(51) Int. Cl.
*G05B 9/02* (2006.01)
*G06F 11/00* (2006.01)

(52) U.S. Cl.
CPC ........... *G05B 9/02* (2013.01); *G06F 11/00* (2013.01); *G05B 2219/25066* (2013.01)

(58) Field of Classification Search
CPC ........................................................ G05B 9/02
USPC ............................................................. 700/79
See application file for complete search history.

(56) References Cited

U.S. PATENT DOCUMENTS

| | | | |
|---|---|---|---|
| 6,176,312 B1 | 1/2001 | Tubel | |
| 7,281,112 B1 * | 10/2007 | Gross | G06F 11/3476 345/555 |
| 7,565,220 B2 | 7/2009 | Huang | |
| 8,024,494 B2 | 9/2011 | Soeda | |
| 2002/0046246 A1 * | 4/2002 | Wright | H04L 51/18 709/206 |
| 2007/0088973 A1 * | 4/2007 | Passerini | G06F 11/1435 714/6.1 |

(Continued)

OTHER PUBLICATIONS

Kontron, PCM-PC Condition Monitoring for industrial PCs, Jan. 2007.

(Continued)

*Primary Examiner* — Kenneth M Lo
*Assistant Examiner* — Yuhui R Pan
(74) *Attorney, Agent, or Firm* — Jared L. Cherry

(57) ABSTRACT

The present disclosure provides systems and methods for recording operating parameters of an intelligent electronic device (IED). A system may include a parameter acquisition module, a parameter storage module, and a memory management module. The parameter acquisition module may be configured to periodically obtain operating parameters of an IED at a first interval. The first interval may have a first time length to provide a first resolution of operation of the IED. The parameter storage module may be configured to store the operating parameters. The memory management module may be configured to delete, outside a first resolution period, a first portion of the operating parameters while maintaining a second portion of the operating parameters. The second portion may include operating parameters for each of a second interval. The second interval may have a second time length to provide a reduced second resolution of the operation of the IED.

20 Claims, 7 Drawing Sheets

(56) References Cited

U.S. PATENT DOCUMENTS

| | | | |
|---|---|---|---|
| 2009/0012728 A1* | 1/2009 | Spanier | G01R 19/2513 |
| | | | 702/61 |
| 2009/0140060 A1 | 6/2009 | Stoner | |
| 2010/0131109 A1 | 5/2010 | Rasmussen | |
| 2010/0286937 A1* | 11/2010 | Hedley | G06Q 30/02 |
| | | | 702/60 |
| 2011/0012603 A1 | 1/2011 | Bose | |
| 2011/0303311 A1 | 12/2011 | Klicpera | |
| 2014/0122800 A1* | 5/2014 | Williams | G05B 23/0221 |
| | | | 711/117 |

OTHER PUBLICATIONS

PCT/US13/67224 Patent Cooperation Treaty, International Search Report and Written Opinion of the International Searching Authority, May 7, 2014.

Kontron, PCM-PC Condition Monitoring for industrial PCs, 2007.

\* cited by examiner

500 

IED 1 Operating Parameters

| | |
|---|---|
| Power supply input (volts AC): | 123.29 |
| Power supply output (volts DC): | 15.041 |
| Node 1 (volts DC): | 5.644 |
| Processor temperature (C): | 71.98 |
| Processor activity (%): | 90 |
| IED Clock: | 3:23:34.182 AM |
| Recorder clock: | 3:23:33.259 AM |
| Clock source: | time server |
| Clock accuracy acceptable: | yes |
| Clock jitter acceptable: | yes |
| Currently logged in: | user1; user 2 |
| Logins (last hour): | 2 |
| Setting changes: | fault rule 1; user 1 |
| Failed login attempts: | 0 |
| Communication port 1 available: | yes |
| Soft bit errors: | 1 |

RECORDING OF OPERATING PARAMETERS OF AN INTELLIGENT ELECTRONIC DEVICE

TECHNICAL FIELD

This disclosure relates to recording operating parameters of an intelligent electronic device.

BRIEF DESCRIPTION OF THE DRAWINGS

Non-limiting and non-exhaustive embodiments of the disclosure are described herein, including various embodiments of the disclosure illustrated in the figures listed below.

FIG. 5 illustrates one embodiment of exemplary operating parameters obtained by a record module.

Figure 1:
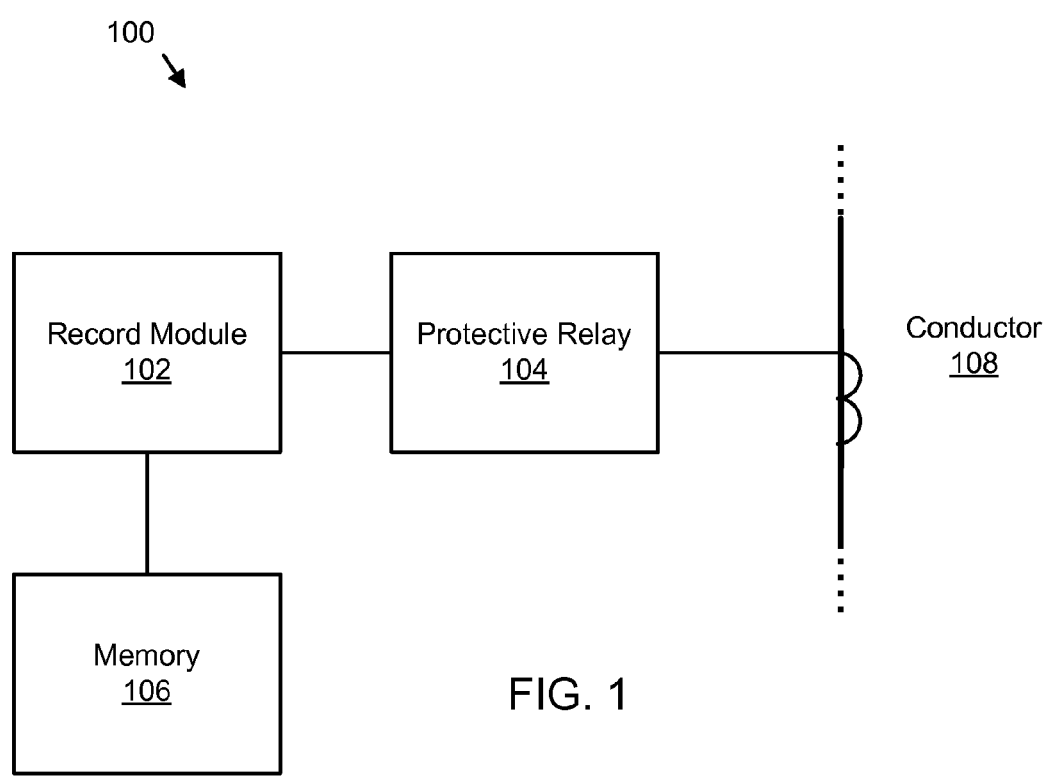
FIG. 1 is a block diagram illustrating one embodiment of a system for recording operating parameters of an intelligent electronic device (IED).

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Intelligent electronic devices (IEDs) may be used for monitoring, protecting, and/or controlling industrial and utility equipment, such as in an electric power delivery system. For example, an IED, such as a programmable logic controller (PLC), protective relay, real-time automation controller (RTAC), or the like may monitor, protect, and/or control various components within an industrial or utility system, such as a power delivery system (which may include, for example, electric power generation, transmission, distribution, and/or consumption). IEDs may be monitored, controlled, and/or managed using any of a wide variety of communication methods. For example, IEDs may include communication channels utilizing Ethernet or serial connections and may implement any of a wide variety of communication protocols and security measures.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. Moreover, networking and communication devices may be incorporated in an IED or be in communication with an IED. The monitored equipment may include conductors such as transmission lines, distribution lines, buses and the like, transformers, autotransformers, voltage regulators, tap changers, capacitor banks, static VAR compensators, reactors, static synchronous compensators, inverters, generators, interties, circuit breakers, switches, motors, fuses, loads, and the like. The term IED may be used interchangeably to describe an individual IED or a system comprising multiple IEDs.

IEDs, like any electronic device, are subject to failure, operating errors, or other events (IED events). These IED events may be due to normal wear caused during usage, manufacturing defects, and/or occurrences that cause accelerated damage or workloads for an IED. These IED events may cause the IED to, expectedly or unexpectedly, stop working. In some situations, IED failure or other IED events can be inconvenient, costly, and/or dangerous. For example, in the case of failure of an IED that is used to monitor, control, automate, or protect equipment within an electric power delivery system, hazards as well as loss of power to large numbers of people may result. Thus, there may be great interest in reducing chances of negative IED events or anticipating failure such that preventative measures such as repair or replacement can be performed in advance.

In order to anticipate failures or other events of IEDs or other devices, real world usage and data may be needed. For example, newly developed IEDs or other products, even if well designed, can have unforeseen problems and weaknesses. Furthermore, it may be very difficult to predict the effect of real world operating circumstances and may even be difficult to predict or realize what IED events might have affected the longevity of an IED. Thus, actual usage and logging of data during usage may lead to extremely useful data in determining a cause of a failure or other IED event as well as predicting and/or monitoring for failures in the future.

In one embodiment, logging of data for an IED may be done using event based tracking. For example, data may be logged during usage of a device and if an event occurs a small amount of data before and/or after the event may be saved. Data not sufficiently close in time to the event may be deleted or overwritten. Sometimes, information is stored in the same memory as other operational data of an IED.

Some embodiments of the present disclosure provide and describe recording operational parameters of an IED for long periods of time. In some embodiments, occurrences that happen long in advance of an IED event may also provide information about the IED event. For example, trends in the deterioration of a voltage at a specific terminal or increase of memory errors for an IED may be indications that the IED may be slowly declining towards failure. Some embodiments of the present disclosure provide and describe the logging of operational parameters even if those parameters are not known to affect the operation or failure of an IED. Some embodiments of the present disclosure provide and describe storing operating parameters at different resolutions over time.

According to one embodiment, the teaching and embodiments provided herein may lead to increased utility of recorded data. According to one embodiment, the teaching and embodiments herein may allow for identification of occurrences that may have indicated or accelerated events or failures of an IED. According to one embodiment, the teaching and embodiments herein may allow for advanced prediction of certain events of an IED.

Aspects of certain embodiments described herein may be implemented as software modules or components. As used herein, a software module or component may include any type of computer instruction or computer executable code located within or on a computer-readable storage medium or a non-transitory computer-readable storage medium, and may include firmware. A software module may, for instance, comprise one or more physical or logical blocks of computer instructions, which may be organized as a routine, program, object, component, data structure, etc., that performs one or more tasks or implements particular abstract data types.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components. For example, in many instances a first component may be described herein as "connected" to a second component, when in fact the first component is connected to the second component via a third component, a section of wire, an electrical trace, another first component, another second component, and/or another electrical component.

Certain components described herein, such as inverters, capacitors, resistors, inductors, input connectors, output connectors, transformers, and the like, are described in their broadest sense. One of skill in the art will recognize that various alternative components or configurations may yield an equivalent circuit or equivalent component. Such modifications are considered within the scope of this disclosure.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

Although various embodiments and descriptions herein refer to a power delivery system, the principles and applications described herein are applicable to various types of industrial, utility, or other computing systems.

FIG. 1 is schematic block diagram illustrating one embodiment of a system 100 for recording operating parameters of an IED. In one embodiment, the system 100 is an electric power delivery system or a portion of an electric power delivery system. The system 100 includes a record module 102, a protective relay 104, and memory 106. The protective relay 104 may be an exemplary IED for which operating parameters may be recorded. In one embodiment, the protective relay 104 monitors conductor 108 and/or includes a processor. The protective relay 104 may obtain information from the conductor 108 using, for example, a current transformer (CT), potential transformer (PT) or the like.

The record module 102 may record operating parameters of an IED such as protective relay 104. The record module 102 may include a hardware device and/or may include software running on a device. For example, the record module 102 may include hardware separate from the protective relay 104. As another example, the record module 102 may include hardware integrated within the protective relay 104. In one embodiment, the record module 102 includes software or firmware running on an IED, such as the protective relay 104, an industrial PC, or other IED.

In one embodiment, the record module 102 periodically obtains operating parameters of the protective relay 104 at a first interval having a first time length. Obtaining the operating parameters at the defined first interval may provide a resolution of operation of the protective relay 104. In one embodiment, the record module 102 stores the operating parameters. The record module 102 may store the operating parameters in the memory 106 or any other location. In one embodiment, the record module 102 deletes, outside a first resolution period, a first portion of the stored operating parameters and maintains a second portion of the operating parameters. The second portion may include operating parameters for each second interval. Each second interval may have a time length greater than the first time length. The longer second time length may provide a second resolution of the operation of the protective relay 104. The second resolution may have a reduced resolution over that of the original first resolution.

The memory 106 may include any type of memory for storage of information. In one embodiment, the memory 106 may include magnetic memory such as a magnetic hard drive. In one embodiment, the memory 106 includes solid state memory such as flash memory. One of skill in the art will understand that, in varying embodiments, any type of memory capable of storing computer readable information may be used. In one embodiment, the memory 106 includes memory external to or internal to another device. For example, the memory 106 may be an external hard drive or may be an internal hard drive or memory card stored within another IED.

The protective relay 104 is only one embodiment of an IED for which operating parameters may be recorded. In one embodiment, the protective relay 104 detects faults or other power system conditions or events on a conductor 108 which may be, for example, a distribution line or a transmission line, or perform any other electric power distribution function. The protective relay 104 may be a digital and/or analog protective relay. In one embodiment, the conductor 108 is used to transmit power from one location to another location. In other embodiments, the protective relay 104 can be replaced with any other type of IED such as an industrial PC, or the like.

The record module 102, memory 106, and protective relay 104 may communicate via any communication means known in the art. In one embodiment, the components 102-106 of the system 100 communicate using a bus of a parent device, a wired or wireless networking interface, or the like. A serial port, universal serial bus (USB) or other communications port or bus may be used for communication.

Figure 2:
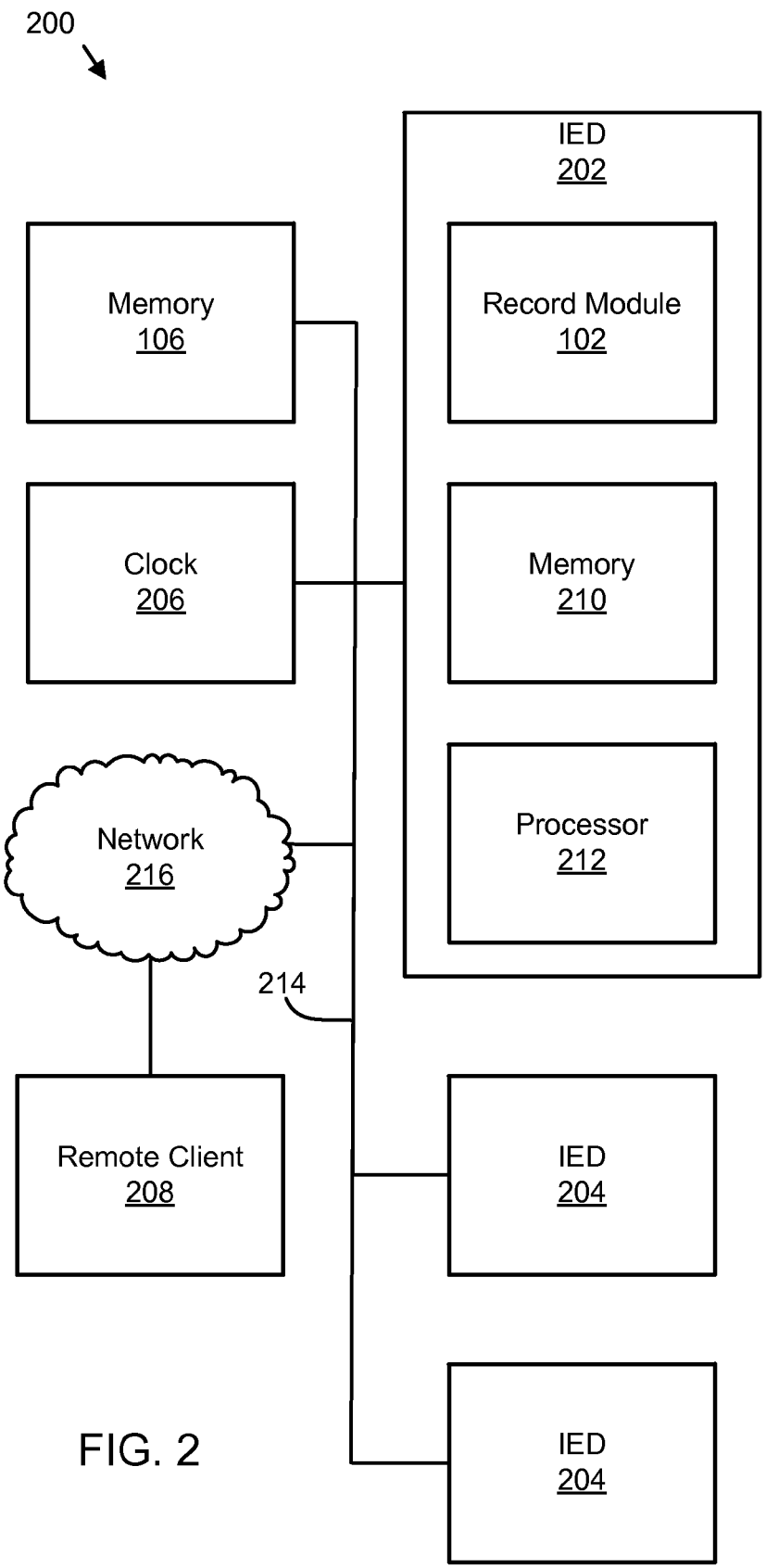
FIG. 2 is a block diagram illustrating another embodiment of a system for recording operating parameters of an IED.

FIG. 2 is schematic block diagram illustrating another embodiment of a system 200 for recording operating parameters of an IED 202. Similar to the system 200 of FIG. 1, the system 200 of FIG. 2 includes a record module 102 and memory 106. However, the system 200 also includes multiple IEDs 202, 204, a clock 206, and a remote client 208. Additionally, the record module 102 is integrated with IED 202, which also includes internal memory 210 and a processor 212. The system 200 also includes an interface 214, which may allow the IEDs 202 and 204, external memory 106, clock 206, and remote client 208 to communicate. In one embodiment, the remote client 208 communicates with the record module 102 over the interface 214 via network 216.

The IED 202 and additional IEDs 204 may be any type of IEDs, such as a remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. The IED 202 includes an integrated record module 102, internal memory 210, and processor 212. The IED 202 may perform one or more monitoring, protection, or control functions within the system 200. According to one embodiment, the processor 212 and memory 210 are used by the IED 202 to execute instructions corresponding to its function within the system 200. In one embodiment, the memory 210 is used to store instructions to be executed by the processor 212 as well as other information. Additional IEDs 204 may also be any of the above described IEDs. In one embodiment, the IED 202 and additional IEDs 204 are each protective relays and each protect electric power system equipment such as conductor 108. According to one embodiment, additional IEDs 204 are part of a legacy electric power distribution system. IED 202 may be an updated IED 202 that performs a similar protective of management function to the additional IEDs 204.

The record module 102 is included within the IED 202. In one embodiment, the record module 102 is a separate hardware device mounted within an enclosure of the IED 202. Of course, in other embodiments, the record module 102 can be mounted external to an IED 202. In one embodiment, the record module 102 is only partially mounted within the IED. The record module 102 may be connected to an internal communication bus of the IED 202. In one embodiment, the record module 102 includes electrical connections to a circuit within the IED 202. For example, electrical or other connections to portions of a circuit or to other internals of the IED may allow the record module 102 to gather information, such as voltages, current, and/or temperature at different locations without querying the IED 202. The record module 102 may be wired in parallel or in serial of a bus or circuit within the IED 202.

In one embodiment, the record module 102 includes instructions to be executed by the processor 212. The instructions of the record module 102 may be stored in internal memory 210 or external memory 106. The record module 102 may operate at the level of a real time operating system, or may operate as a virtual machine.

In one embodiment, the record module 102 is used to record operating parameters of the host IED 202. For example, the record module 102 may obtain operating parameters of the IED 202 and store them in internal memory 210 and/or external memory 106. The record module 102 may store operating parameters in memory independent from memory used by the IED 202. Storage in external memory and/or back up of operating parameters may allow for reduced likelihood of loss upon failure of the IED 202.

In one embodiment, the record module 102 is used to record operating parameters of the additional IEDs 204. A record module 102 embodied in software instructions may include a virtual machine for each of the IEDs 202 and 204. The record module 102 may include a hardware device that communicates with the additional IEDs 204 via an interface 214. For example, the record module 102 may request operating parameters from the additional IEDs 204.

The external clock 206 may provide redundancy for clocks within IEDs 202 and 204. The external clock 206 may be used to check for errors in a clock of the IEDs 202 and 204. For example, the record module 102 may use the external clock 206 to check for the clock accuracy, clock jitter, and the like of clocks of the IEDs 202 and 204. In one embodiment, the time of the external clock 206 is logged with operating parameters to ensure accurate recording of occurrence of IED events. The external clock may provide a common time for each of the IEDs on the network. The common time may be derived from a universal time such as that obtained using GPS, or from the WWV or WWVB radio station signals. The common time may be provided by a local common time source such as a communication network time or time server.

The remote client 208 may be used to access the IEDs 202 and 204, as well as the external memory 106, and the external clock 206. For example, the remote client 208 may be used to retrieve information stored by any of the other components in the system 200 or may be used to change settings, monitor, or perform other administrative actions on the system 200. For example, the remote client 208 may be able to access data stored by the record module 102. In one embodiment, the remote client 208 receives notifications or other information from the IEDs 202 and 204, memory 106, and/or clock 206. Thus, a user may not need to be on site with the IEDs 202 and 204 to check on their operational state or view their current or past operating parameters. The remote client 208 may include a device, an internet browser, or other client. Exemplary remote clients 208 include a computing device such as a desktop computer, laptop computer, tablet computer, smart phone, or the like.

The remote client 208 may be located at a remote location from the IEDS 202 and 204. For example, the remote client 208 may communicate with the IEDs 202 and 204 via a network 216 such as a local area network, wide area network, or the Internet. The network 216 may be connected via the interface 214 to the IEDs 202 and 204, external memory 106, and/or clock 206. The interface 214 may include any communication medium or cable known in the art as well as utilize any protocol. The interface 214 may be a wireless or wired Ethernet interface.

Figure 3:
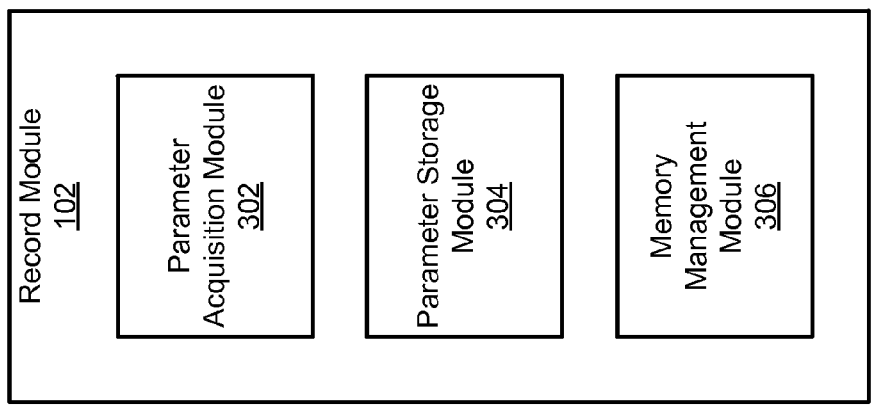
FIG. 3 is a block diagram illustrating one embodiment of a record module for recording operating parameters of an IED.

FIG. 3 is a schematic block diagram illustrating one embodiment of a record module 102. The record module 102 includes a parameter acquisition module 302, a parameter storage module 304, and a memory management module 306. The record module 102 may record operating parameters of an IED such as the protective relay 104 of FIG. 1 or IEDs 202 and 204 of FIG. 2.

In one embodiment, the parameter acquisition module 302 obtains operating parameters of an IED. The parameter acquisition module 302 may obtain the operating parameters at a periodic interval. The periodic interval may have a first time length such that the parameter acquisition module 302 obtains operating parameters about once per every first time length. The operating parameters may thus provide a first resolution of operation of the IED. For example, if the parameter acquisition module 302 obtains operating parameters every one millisecond operating parameters may provide a one millisecond resolution of the operation of the IED.

The parameter acquisition module 302 may obtain operating parameters by requesting operating parameters from an IED. In one embodiment, the parameter acquisition module 302 may send a request to another device or an IED such as a host IED 202, a protective relay 104, or other IEDs 204. The request may be sent over an internal or external communications bus or port. In one embodiment, the request may be sent over a communications interface 214 such as an Ethernet interface. The parameter acquisition module 302 may receive one or more messages with information regarding operating parameters. In one embodiment, an IED may be configured to only send operating parameters when requested. The parameter acquisition module 302 may receive operating parameters from an IED on a set schedule. For example, the parameter acquisition module 302 may receive operating parameters from an IED at certain times without sending a request.

In one embodiment, the parameter acquisition module 302 obtains operating parameters by sampling a voltage, current, temperature, or the like at a location within an IED. The record module 102 may be at least partially mounted within an IED and the parameter acquisition module 302 may sample a location within the IED to obtain operating parameters. For example, the parameter acquisition module 302 may sample a voltage via a connection to a location within a circuit of the IED. In one embodiment, the parameter acquisition module 302 may have a connection to a bus or other location within the IED where the parameter acquisition module 302 can obtain operating parameters by gathering data during operation of the IED. For example, the parameter acquisition module 302 may be able to obtain data via the direct connection without requiring the IED to perform a specific operation to send the parameter acquisition module 302 operating parameters.

The parameter acquisition module 302 may be a software module operating within an IED. According to one embodiment, the parameter acquisition module 302 receives operating parameters from another process executing on an IED. For example, a process on the IED may track the occurrence of bit errors, voltages at specific locations in a circuit, login attempts, or the like. The parameter acquisition module 302 may receive information from the process and thereby obtain operating parameters.

The operating parameters obtained by the parameter acquisition module 302 may vary considerably. According to one embodiment, the parameter acquisition module 302 obtains hardware operating parameters, or in other words, data regarding the hardware of the IED. Exemplary hardware operating parameters may include voltages, currents, impedances, temperatures, or the like. Hardware operating parameters may be obtained via directly sampling an operating parameter or receiving a report of an operating parameter from an IED. For example, hardware operating parameters may be obtainable with or without processing activity of the IED. This may allow a parameter acquisition module 302 to obtain data without slowing an IED or without the IED even needing to know that operating parameters are being gathered. As another example, an IED may be capable of obtaining hardware operating parameters on its own so it may be more cost effective to receive these operating parameters from the IED.

According to one embodiment, the parameter acquisition module 302 obtains software operating parameters, or in other words, data regarding the operation of software and/or the transmission or storage of data. Exemplary software operating parameters may include activity of a processor or other component, clock time, clock accuracy, clock jitter, clock source, currently logged in individuals, attempted logins, setting changes, information regarding operation of a communication port, soft bit errors (errors in memory), or the like. In one embodiment, software parameters can only be obtained by receiving a message from the IED by a parameter acquisition module 302 that includes code executing on the IED. For example, a record module 102 that is a hardware device separate from an IED may need to request and/or receive operating parameters from the IED.

The operating parameters obtained by the parameter acquisition module 302 may include actual parameter values. For example, the operating parameter for an output voltage from a power supply may be 120.32 volts. Alternately or additionally, the operating parameters may include an indicator that indicates whether a parameter is within a predefined operating window. For example, an operating parameter may include a '1', 'Yes', True', or other indicator to indicate that a current actual voltage is within an acceptable range. In one embodiment, a parameter value may be deemed to be normal within a certain range and it may not be seen as worth any extra memory to store an actual value. In other embodiments, the actual value may be stored to provide more exact data which may be helpful in reconstructing what may have caused an IED to fail. The parameter acquisition module 302 obtaining the operating parameters may include comparing an operating parameter with the predefined operating window.

In one embodiment, the parameter acquisition module 302 obtains all operating parameters of interest at each interval. For example, the parameter acquisition module 302 may obtain a current parameter value or indicator for each operating parameter. In another embodiment, the parameter acquisition module 302 may obtain some operating parameters less frequently than each interval. For example, some operating parameters may not require storing of the full resolution provided by the interval.

FIG. 5 illustrates one embodiment of a report 500 of operating parameters 502 obtained by the parameter acquisition module 302. Labels 504 indicate a meaning of the operating parameters 502. According to one embodiment, the report 500 includes operating parameters 502 which have been obtained at a predetermined interval. For example, each of the operating parameters 502 may correspond to the time of the "IED Clock" and "Recorder Clock" parameters.

The operating parameters 502 may include a variety of different types of parameters. The operating parameters 502 may include a voltage of a power supply input. The operating parameters 502 may include a voltage of a power supply output. The operating parameters 502 may include a voltage of a node within a circuit. The operating parameters 502 may include a temperature of a process and/or the processors percent activity. The operating parameters 502 may include a current time of an IED clock, a recorder module clock, and/or a source used for updating the IED clock or recorder module clock. The operating parameters 502 may include values indicating whether a current clock accuracy and/or clock jitter are acceptable. The operating parameters 502 may include a list of users who are currently logged in to an IED or other system. The operating parameters 502 may include a total number of logins in the past hour and/or a number of failed login attempts. The operating parameters 502 may include information regarding settings that have changed and who made the changes. The operating parameters 502 may include the availability of one or more communication ports. The operating parameters 502 may include a number of soft bit errors since the last interval, or in a last predetermined amount of time. Soft bit errors may include errors in memory that have detected and/or fixed.

The operating parameters 502 of FIG. 5 are provided for illustrative purposes only. Numerous additional or alternate operating parameters 502 may be obtained and/or stored in various embodiments. For example, currents, impedances, or voltages at locations within an electrical circuit, functioning status of chips or other systems, or other information may be obtained. In one embodiment, the working status of a communications port or channel may be obtained. For example, a report that includes round-trip delay measurement, channel asymmetry measurement, and lost packet counts may be included as a part of the report 500 of FIG. 5. The operating parameters 502 obtained may vary based on the IED. For example, different operating parameters may be collected for a protective relay than for an RTAC. Similarly, fewer or additional operating parameters may be included depending on the required level of detail regarding operation of an IED that is desired.

Returning to FIG. 3, the parameter storage module 304 may store any operating parameters obtained by the parameter acquisition module 302. The parameter storage module 304 may store the operating parameters in memory internal to the record module 102, internal memory 210 in an IED, and/or external memory 106. According to one embodiment, the parameter storage module 304 stores the operating parameters in independent memory. For example, the parameter storage module 304 may store the operating parameters in memory separate from memory used by a monitored IED or a record module 102.

The parameter storage module 304 may store the operating parameters in a variety of formats. The parameter storage module 304 may store the operating parameters in a report format such as that depicted in FIG. 5. The parameter storage module 304 may store the operating parameters in a table. For example, a single row may correspond to operating parameters corresponding to the same interval and different columns may correspond to different values for operating parameters. In one embodiment, for example, a row of a table may correspond to the report 500 of FIG. 5 and a column may correspond to power supply voltages over time. The parameter storage module 304 may store the operating parameters in a database or any other format.

In one embodiment, the memory management module 306 manages storage of the operating parameters. The memory management module 306 may maintain or remove operating parameters to allow for different resolutions of operating parameters depending on how old the operating parameters are. Reducing a resolution of stored operating parameters may reduce an amount of needed memory. For example, by reducing the amount of stored operating parameters outside one or more resolution windows the amount of required memory 106 or 206 of a system 100, 200 may be reduced. The memory management module 306 may remove operating parameters at determined times to maintain varying resolutions for multiple resolution windows.

According to one embodiment, the memory management module 306 deletes a portion of operating parameters as the operating parameters reach a certain age. For example, the memory management module 306 may delete some operating parameters by releasing corresponding memory for usage. The memory management module 306 may delete, outside a first resolution period, a first portion of the operating parameters while maintaining a second portion of the operating parameters. In one embodiment, the stored operating parameters for the time period corresponding to the first resolution period have a first, higher resolution while stored operating parameters corresponding to a time period outside the first resolution period have a lower resolution. The second portion that is maintained in memory may include operating parameters for each of a second interval. The second interval may have a second time length to provide a reduced second resolution, with respect to the first resolution, of the operation of the IED. For example, if the first resolution is twice as high as the second resolution the second interval may be twice as long as the first interval and one set out of every two sets of operating parameters may be deleted. Any other ratio of deleted to non-deleted operating parameters may also be used.

In one embodiment, the memory management module 306 also deletes, outside a second resolution period, a portion of the second portion of operating parameters while maintaining a third portion of the operating parameters. The third portion of operating parameters may include operating parameters for each third interval having a third time length to provide a reduced third resolution of the operation of the IED. Thus, according to one embodiment, the resolution of stored operating parameters begins at a first resolution and is consecutively reduced to a second resolution and a third resolution.

Figure 6:
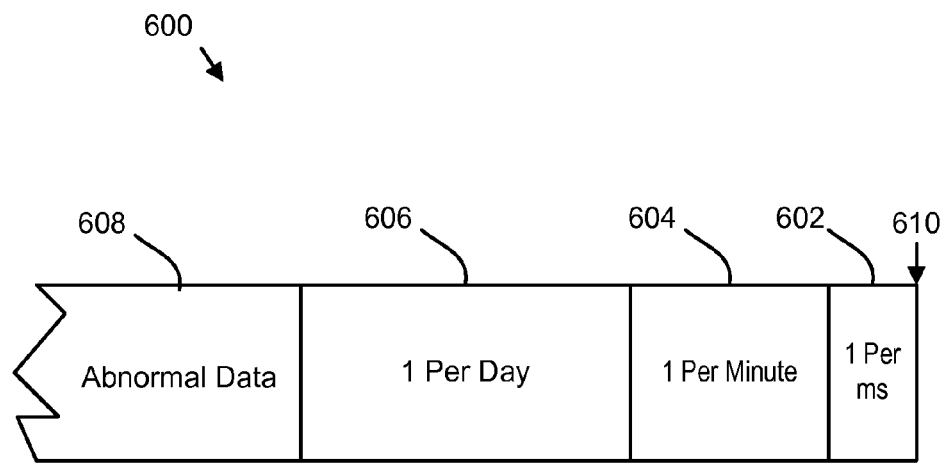
FIG. 6 is a schematic diagram illustrating one embodiment of resolution windows for operating parameters stored by a record module.

FIG. 6 is a schematic diagram 600 illustrating exemplary resolution windows 602-608. The resolution windows include a first resolution window 602, a second resolution window 604, a third resolution window 606, and a fourth resolution window 608. Each resolution window 602-608 may include a time length and a resolution. According to one embodiment, the time length is a time period represented by a time window and a resolution is the frequency of operating reports stored in memory.

According to one embodiment, the resolution windows 602-608 represent time windows where different resolutions of operating parameters are maintained by the memory management module 306. Arrow 610 indicates an instant most recent in time while locations to the left correspond to earlier points in time. For example, arrow 610 may indicate the present while the first resolution window 602 represents the last hour, the second resolution window 604 represent the last twenty-four hours up unto the last hour, the third resolution window 606 represents the last year up until the last twenty-four hours, and the fourth resolution window 608 represents a period previous to the last year.

According to one embodiment, the first resolution window 602 is a time period where the most operating parameters per unit of time are retained in memory. For example, the number of operating parameters, or reports of operating parameters, stored in a given length of time may be reduced in the second resolution window 604, third resolution window 606, and beyond. In one embodiment, the first resolution window 602 maintains operating parameters at a resolution of 1 per millisecond. For example, a report including all of the operating parameters may be obtained by the parameter acquisition module 302, and stored by the parameter storage module 304 once every millisecond. An interval at which the parameter acquisition module 302 obtains operating parameters may determine the resolution of the first resolution window.

According to one embodiment, as operating parameters age, the memory management module 306 deletes a portion of the operating parameters. For example, as reports of operating parameters pass from the first resolution window 602 to the second resolution window 604, the memory management module 306 may delete a portion of these reports to maintain a resolution corresponding to a current resolution window for the operating parameters. The memory management module 306 may delete all operating parameters except for one set per minute as the operating parameters move into the second resolution window. Similarly, further deletions may occur as data ages into the third resolution window 606 and fourth resolution window. Thus, one report per millisecond may be stored during the first resolution window 602, one report per minute may be stored during the second resolution window 604, one report per day may be stored during the third resolution window 606, and only abnormal data may be stored during the fourth resolution window 608. Abnormal data may include only data that is located in time near an error or a change in value or other occurrence that is out of the ordinary. In one embodiment, the abnormal data may never be deleted during a life time of a corresponding IED.

The time lengths and resolutions of the resolution windows 602-608 are exemplary only. For example, any other resolution or length of time for each of the resolution windows 602-608 may be used without limitation. In one embodiment, the time lengths of the resolution windows 602-608 increases as the covered period gets further in the past. For example, the second resolution window 604 may have a longer time length than the first resolution window 602. In one embodiment, the time resolutions of the resolution windows 602-608 decreases. For example, the second resolution window 604 may have a lower resolution than the first resolution window 602.

Figure 7:
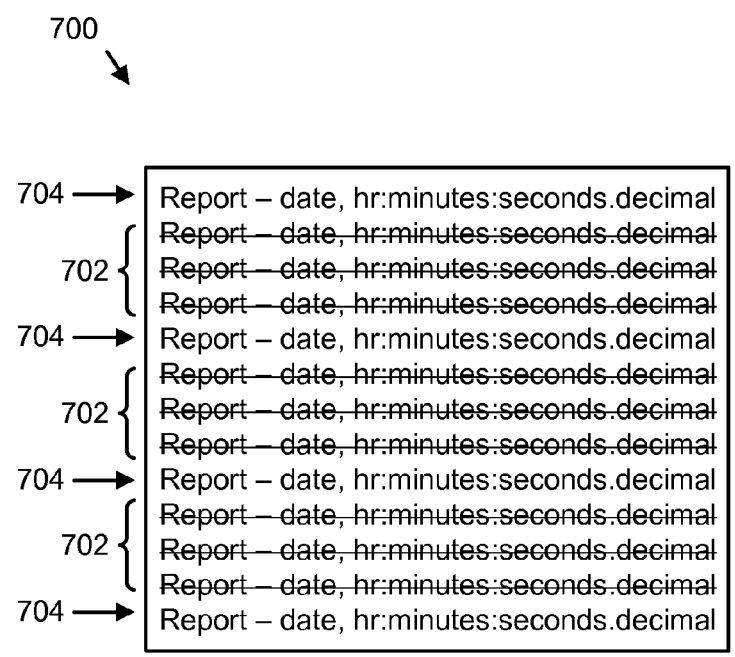
FIG. 7 illustrates exemplary deletion of a portion of operating parameters while maintaining another portion in memory

FIG. 7 illustrates exemplary deletion of a portion of operating parameters from a portion of memory 700. The portion of memory 700 may include a portion of memory within internal memory 210 or external memory 106. The portion of memory 700 is shown holding reports of operating parameters 702-704. According to one embodiment, reports include deleted reports 702 which are to be deleted as the reports age from one resolution window to the next and maintained reports 704 which may be maintained in memory.

The maintained reports 704 are shown and include every fourth report while the deleted reports 702 include three out of every four reports. This forms a ratio of 1/3 for of deleted to maintained reports. This ratio is exemplary only and may vary. For example, the ratio of maintained to deleted reports between the first resolution window 602 and the second resolution window 604 of FIG. 6 may be 1/59,000 because the resolution changes from one per millisecond to one per minute (1,000 milliseconds per second and 60 seconds per minute).

The memory management module 306 may delete the deleted reports 702. The memory management module 306 may maintain the maintained reports 704 in memory without change. For example, the maintained reports 704 may be stored without any modifications to the data. In one embodiment, the maintained reports 704 may be modified to include averages for parameter values based on the deleted reports 702. For example, the operating parameters of a maintained report 704 may be averaged and/or combined with the operating parameters of three of the deleted reports 702.

An operating parameter may be averaged by summing the values of a number of operating parameters and dividing by the number of operating parameters summed. For example, a processing activity percentage operating parameter for four different reports may be summed and divided by four to give an averaged processor activity percentage. An operating parameter may be combined by adding up operating parameters. For example, a soft bit errors operating parameter for four different reports may be summed to create the operating parameter for a maintained report 704. In one embodiment, an operating parameter may be combined by performing an "OR" or "NOT-OR" operation. For example, a clock accuracy acceptable operating parameter for a maintained report 704 may be "No" or "False" if any of four different reports have a "No" or "False" value. Similarly, a clock accuracy acceptable operating parameter for a maintained report 704 may be "Yes" or "True" if any of four different reports have a "Yes" or "True" value.

The record module 102 embodiment of FIG. 3 discussed above may provide a range of benefits according to some of the above variations. For example, data regarding operation of an IED may be maintained for long periods of time. With the use of varying resolution windows, data for long periods of time may be stored with low memory requirements. Maintaining data for long periods may allow trends or causes of IED events that occurred long before an IED event to be recognized. For example, if an IED fails, a large amount of data may be analyzed to determine the cause or contributing factors of the IED failure. A technician or other user may be able to identify an abnormality that happened hours, days, or months before the failure of the IED. Similarly, long term trends for operating parameters may be evaluated to see how an IED operates as it ages. Thus, the record module 102 of FIG. 3 may allow for better data collection and storage allowing for a better understanding of the operation and causes of events within an IED.

Figure 4:
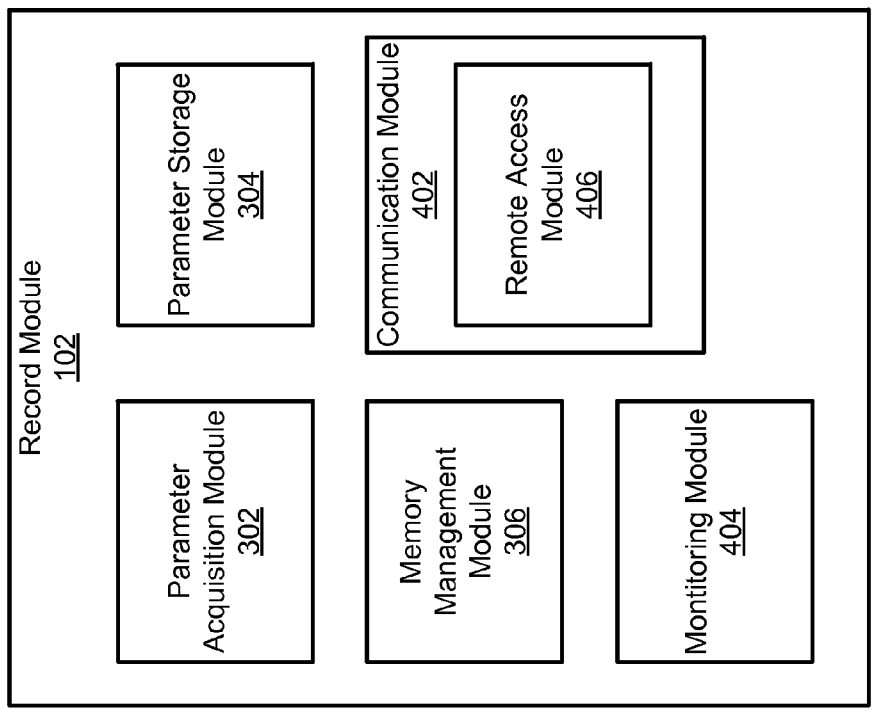
FIG. 4 is a block diagram illustrating another embodiment of a record module for recording operating parameters of an IED.

FIG. 4 is a schematic block diagram illustrating another embodiment of a record module 102. Similar to FIG. 3 the record module 102 of FIG. 4 includes a parameter acquisition module 302, a parameter storage module 304, and a memory management module 306. The modules 302-306 may have any of the variations or functionality discussed herein. The record module 102 also includes a communication module 402 and a monitoring module 404. In some embodiments, the record module 102 of FIG. 3 may also include the communication module 402 and/or the monitoring module 404.

The communication module 402 may provide functionality for the record module 102 to communicate with other modules, devices, or systems. For example, the communication module 402 may enable the record module 102 to communicate with the protective relay 104 and/or external memory 106 of FIG. 1. Similarly, the communication module 402 may enable communication with the external clock 206, network 216, remote client 208, and IEDs 204 of FIG. 2.

In one embodiment, the communication module 402 includes hardware and/or software for communicating with other modules, devices, or systems using any protocol or interface. The communication module 402 may communicate with other devices, modules, or systems using an Ethernet connection and Ethernet protocol, or any other wired or wireless networking interface and protocol. Similarly other interfaces, buses, and/or protocols may be used. The communication module 402 may send and/or receive messages for the other modules 302-306 and 404. For example, the communication module 402 may send messages to IEDs requesting operating parameters. As another example, the communication module 402 may send notifications to another device or system, such as remote client 208, regarding the operation of the record module 102 or a monitored IED.

In one embodiment, the communication module 402 may include a remote access module 406. The remote access module 406 may allow for access to the record module 102 from a remote location. For example, the remote access module 406 may allow access to the settings of the record module 102, stored operating parameters, or the like to a remote client 208 over a network such as a local area network (LAN), wide area network (WAN), or the Internet. The remote access module 406 may serve a web page or other visual interface for a user to login and/or access the record module 102.

The monitoring module 404 may monitor operation of one or more IEDs. In one embodiment, the monitoring module 404 monitors the one or more IEDs by comparing operating parameters to one or more monitoring rules. The monitoring module 404 may detect the occurrence of an IED event defined by the rules and/or perform an action defined by the rule. The monitoring module 404 may provide a notification to a remote client 208.

Figure 8:
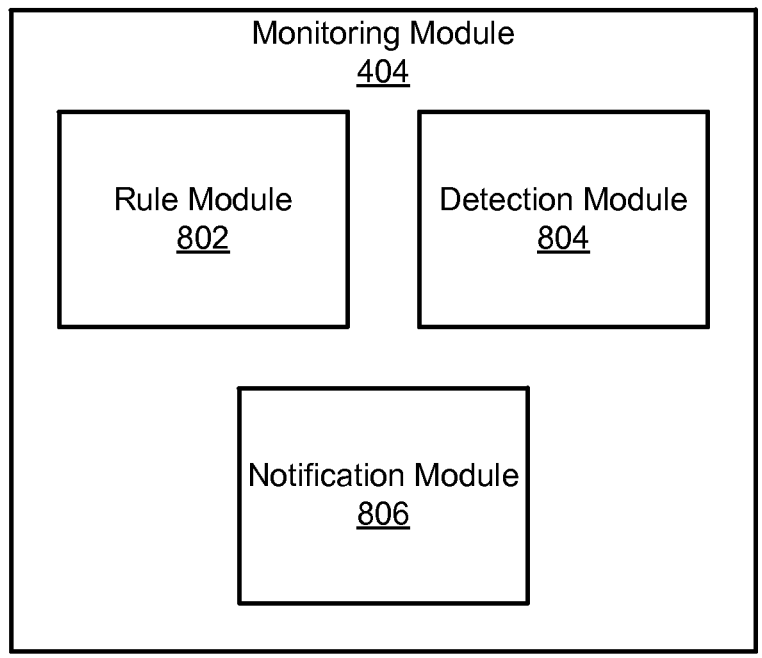
FIG. 8 is a block diagram illustrating one embodiment of a monitoring module for monitoring operation of an IED.

FIG. 8 is a schematic block diagram illustrating one embodiment of a monitoring module 404. The monitoring module 404 may monitor IEDs, detect IED events, and/or performed defined actions. The monitoring module 404 includes a rule module 802, a detection module 804, and a notification module 806.

In one embodiment, the rule module 802 stores one or more rules defining one or more IED events. For example, the rule module 802 may store a rule that defines a certain change in operating parameters, trend in operating parameters, or other occurrence as an IED event. The rules may define IED events corresponding to causes of immediate failure and/or IED events that correspond to occurrences having or indicating long term impacts on an IED.

The rule module 802 may allow for modification of the rules. For example, a user on a remote client 208 may be able to login to a record module 102 or IED and add, delete, or modify rules stored by the rule module 802. A user may recognize an additional IED event which would be useful to detect on an IED and may add a new rule to be stored by the rule module 802 defining that IED event. In one embodiment, the rule module 802 provides an interface for viewing and/or modifying rules.

In one embodiment, the detection module 804 compares operating parameters to the rules stored by the rule module 802. For example, the detection module may compare the rules to operating parameters obtained by the parameter acquisition module 302. The detection module 804 may detect an IED event based on a comparison of a rule to the operating parameters. The monitoring module 404 may trigger an action in response to the detection module 804 detecting the IED event. An action taken by the monitoring module 404 may include the sending of a notification, modification of a setting, powering of an IED, or the like.

In one embodiment, the notification module 806 notifies a user or device of an occurrence of an IED event. For example, the notification module 806 may send a message using a communication module 402 to a remote client 208. The notification may include information regarding the IED event, including its severity, time of occurrence, and the like. The notification may be an alarm signaling that a failure or other IED event has taken place or is predicted to take place. The remote client 208 or a user of the remote client 208 may be able to take actions based on the notification.

Figure 9:
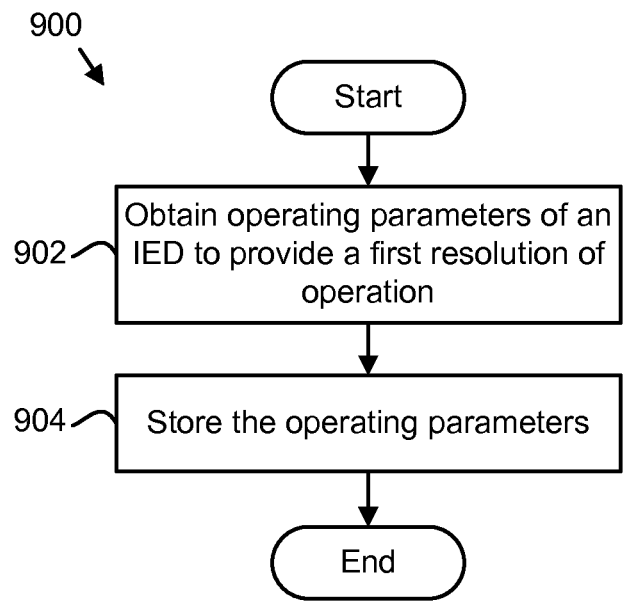
FIG. 9 is a schematic flow chart diagram illustrating one embodiment of a method for storing operating parameters.

FIG. 9 is schematic flow chart diagram illustrating one embodiment of a method 900 for recording operating parameters of an IED. The method 9 may be performed by a record module 102, such as the record module 102 of FIG. 3 or 4.

The method 900 may include the parameter acquisition module 302 obtaining 902 operating parameters of an IED. The operating parameters may be obtained 902 at a defined interval which may result in a first resolution of the operation of the IED. The parameter acquisition module 302 may obtain 902 the operating parameters by directly sampling a portion of a circuit or listening on a bus or interface of an IED. In one embodiment, the parameter acquisition module 302 obtains 902 the operating parameters by requesting and/or receiving operating parameters from an IED over a communication interface. For example, the parameter acquisition module 302 may obtain 902 the operating parameters by sending or receiving a message over an Ethernet connection.

The method 900 may include the parameter storage module 304 storing 904 operating parameters. The parameter storage module 304 may store 904 operating parameters obtained 902 by the parameter acquisition module 302 in memory internal or external to an IED. In one embodiment, the parameter storage module 304 stores 904 the operating parameters in independent memory. For example, independent memory may be a memory device or a portion of memory that is not used by an IED. Storage 904 of the operating parameters in independent memory may reduce the chance of loss of the operating parameters in the case of IED failure.

Figure 10:
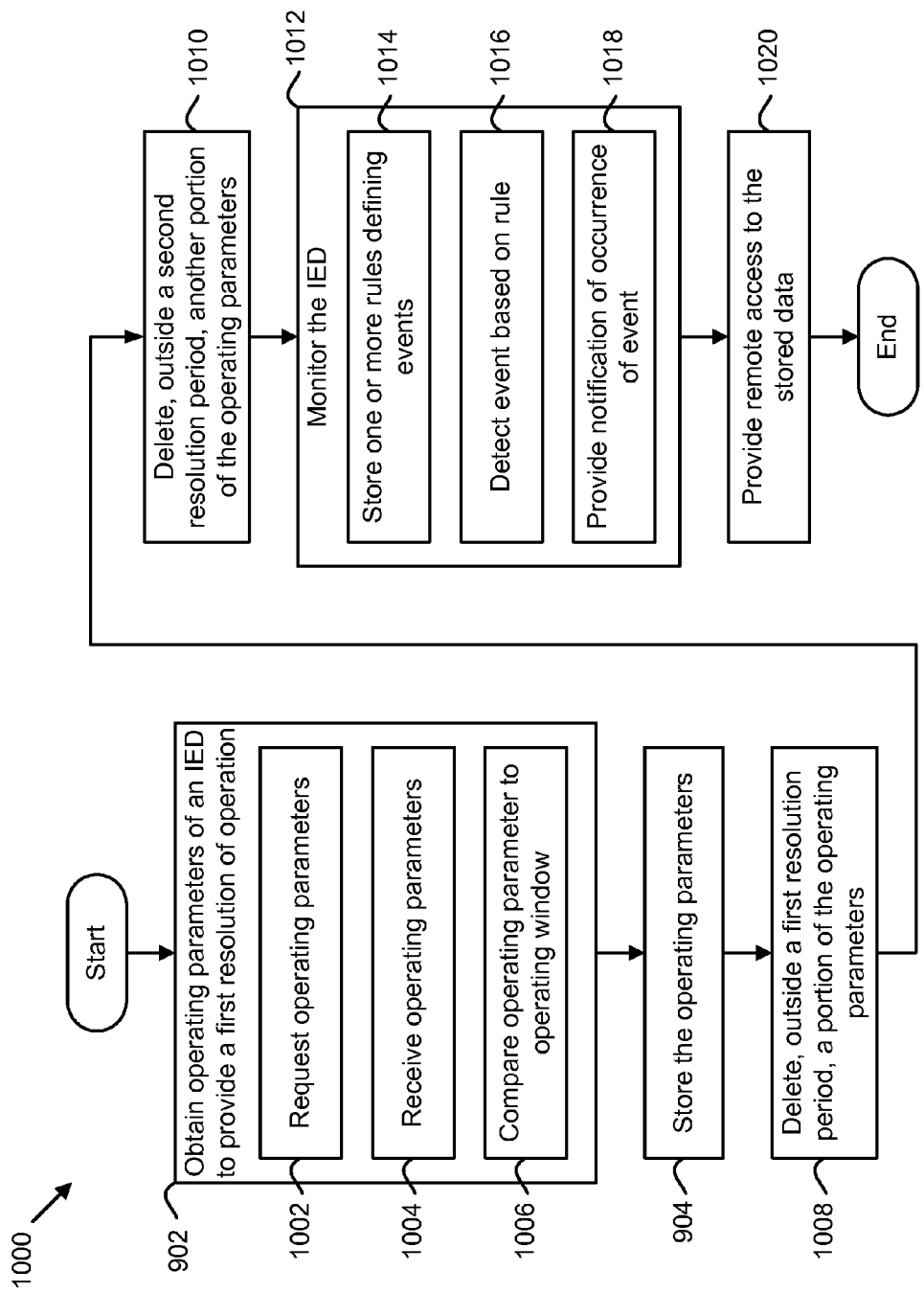
FIG. 10 is a schematic flow chart diagram illustrating another embodiment of a method for storing operating parameters.

FIG. 10 is schematic flow chart diagram illustrating another embodiment of a method 1000 for recording operating parameters of an IED. The steps 902-904 and 1002-1020 are exemplary only and may not be included in all embodiments. In fact, different embodiments may include any one or a combination of two or more of any of the steps 902-904 and 1002-1020 of the method 1000.

The method 1000 includes the parameter acquisition module 302 obtaining 902 operating parameters of an IED. Obtaining 902 the operating parameters may be performed with any of the variations discussed in relation to FIG. 9 or elsewhere in the present disclosure. In one embodiment, obtaining 902 the operating parameters includes the parameter acquisition module 302 requesting 1002 operating parameters. For example, the parameter acquisition module 302 may send a request to an IED for operating parameters. Obtaining 902 the operating parameters may include the parameter acquisition module 302 receiving 1004 the operating parameters. For example, the parameter acquisition module 302 may receive the operating parameters in a message from an IED.

Obtaining 902 the operating parameters may include the parameter acquisition module 302 comparing 1006 an operating parameter to an operating window. The operating window may be a range for the operating parameter that is considered to be normal. For example, if it is considered normal for a power supply input voltage to be between 115 to 125 volts the parameter acquisition module 302 may compare a current voltage reading to the normal range of 115 to 125 volts. If the operating parameter is within the normal range an indicator that indicates that the operating parameter is normal may be obtained and/or stored.

The method 1000 may include a parameter storage module 304 storing 904 operating parameters. Storing 904 the operating parameters may be performed with any of the variations discussed in relation to FIG. 9 or elsewhere in the present disclosure.

The method 1000 may include a memory management module 306 deleting 1008 a portion of operating parameters and maintaining other operating parameters in memory. The memory management module 306 may delete 1008 the portion of operating parameters outside of a first resolution period to reduce the stored resolution of operation for the IED to a second resolution. The portion of operating parameters that are not deleted may include parameters for each of a second interval. For example, the memory management module 306 may delete 1008 all but one report per second interval. As another example, if the original resolution is 1 report per millisecond and the next resolution is 1 report per second, the memory management module 306 may delete 1008 all reports except one for each second.

The method 1000 may further include additional reductions of resolution. In one embodiment, the method 1000 includes a memory management module 306 deleting 1010 an additional portion of operating parameters. The memory management module 306 may delete 1010 the additional portion of operating parameters outside of a second resolution period to reduce the stored resolution of operation for the IED to a third resolution. The portion of operating parameters that are not deleted may include parameters for each of a third interval. For example, the memory management module 306 may delete 1010 all but one report per third interval. As another example, if the second resolution is 1 report per second and the next resolution is 1 report per hour, the memory management module 306 may delete 1010 all reports except one for each hour.

The method 1000 may include monitoring 1012 one or more IEDs. In one embodiment, a monitoring module 404 may monitor 1012 an IED to detect errors or problematic IED events. Monitoring 1012 one or more IEDs may include a rule module 802 storing 1014 one or more rules defining IED events. The rules may define IED events corresponding to causes of immediate failure and/or IED events that correspond to occurrences having or indicating long term impacts on an IED. For example, an IED event defined by a rule may indicate that an IED will likely soon fail. In one embodiment, monitoring 1012 one or more IEDs includes a detection module 804 detecting an IED event based on one or more of the stored 1014 rules. Monitoring 1012 one or more IEDs may include providing 1018 a notification of the occurrence of the detected 1016 IED event. For example, providing 1018 a notification may include sending a message to a remote client 208 or other device.

The method 1000 may include a remote access module 406 providing 1020 remote access to the stored data. In one embodiment, the remote access module 406 provides 1020 remote access to devices at a remote location. The remote access module 406 may provide 1020 remote access to devices located remotely over a network, such as LAN, WAN, or the Internet. The remote access module 406 may provide 1020 remote access by providing a web page or other interface for a user to login to a record module 102 or IED using a remote client 208.

The above description provides numerous specific details for a thorough understanding of the embodiments described herein. However, those of skill in the art will recognize that one or more of the specific details may be omitted, modified, and/or replaced by a similar process or system.

What is claimed:

1. A system for recording operating parameters of an intelligent electronic device (IED) comprising:
    an IED operating within an electric power delivery system, configured to obtain electric power system operating parameters and configured to record electric power system operating parameters and IED operating parameters; and
    a record module comprising:
        a parameter acquisition module configured to continuously obtain IED operating parameters of the IED at a first resolution having a first interval having a first time length;
        a parameter storage module configured to store the obtained IED operating parameters to provide stored IED operating parameters at the first resolution; and
        a memory management module configured to delete, outside a first resolution period, a first portion of the IED operating parameters while maintaining a second portion of the IED operating parameters, wherein the second portion comprises IED operating parameters for each second interval having a second time length to provide a reduced second resolution of the operation of the IED;
        wherein the memory management module is further configured to identify an IED event and to delete outside of a third interval a third portion of the IED operating parameters while maintaining the IED operating parameters for the third interval associated with the IED event, the third interval having a third time length;
        wherein the parameter storage module is further configured to store the IED operating parameters at the second resolution and the IED operating parameters for the third interval associated with the IED event.

2. The system of claim 1, wherein the parameter storage module is configured to store the IED operating parameters on independent memory.

3. The system of claim 1, wherein the record module is integrated with the IED.

4. The system of claim 1, wherein the record module comprises discrete hardware separate from the IED.

5. The system of claim 4, wherein the record module is at least partially mounted within the IED.

6. The system of claim 5, wherein the record module communicates with the IED via an internal bus.

7. The system of claim 4, wherein the record module is externally mounted from the IED and communicates with the IED via a communication interface.

8. The system of claim 6, wherein the communication interface comprises an Ethernet connection.

9. The system of claim 1, wherein the record module is configured to store IED operating parameters of one or more additional IEDs.

10. The system of claim 1, wherein the IED comprises a digital protective relay.

11. The system of claim 1, wherein the stored IED operating parameters are remotely accessible.

12. An apparatus for recording IED operating parameters of an intelligent electronic device (IED) in an electric power delivery system, the IED configured to obtain electric power system operating parameters from an electric power delivery system and configured to obtain IED operating parameters, the apparatus comprising:
 a parameter acquisition module configured to continuously obtain IED operating parameters of the IED at a first resolution having a first interval having a first time length;
 a parameter storage module configured to store the obtained IED operating parameters to provide stored IED operating parameters at the first resolution; and
 a memory management module configured to delete, outside a first resolution period, a first portion of the IED operating parameters while maintaining a second portion of the IED operating parameters, wherein the second portion comprises IED operating parameters for each second interval having a second time length to provide a reduced second resolution of the operation of the IED;
 wherein the memory management module is further configured to identify an IED event and to delete outside of a third interval a third portion of the IED operating parameters while maintaining the IED operating parameters for the third interval associated with the IED event, the third interval having a third time length;
 wherein the parameter storage module is further configured to store the IED operating parameters at the second resolution and the IED operating parameters for the third interval associated with the IED event.

13. A non-transitory computer-readable medium having instructions encoded thereon, the instructions configured to be executed by a processor to:
 continuously obtain IED operating parameters of an IED related to operation of the IED, at a first resolution having a first interval having a first time length;
 store the obtained IED operating parameters to provide stored IED operating parameters at the first resolution; and
 delete, outside a first resolution period, a first portion of the IED operating parameters while maintaining a second portion of the IED operating parameters, wherein the second portion comprises IED operating parameters for each second interval having a second time length to provide a reduced second resolution of the operation of the IED;
 identify an IED event and to delete outside of a third interval a third portion of the IED operating parameters while maintaining the IED operating parameters for the third interval associated with the IED event, the third interval having a third time length;
 store the IED operating parameters at the second resolution and the IED operating parameters for the third interval associated with the IED event.

14. A method for monitoring an intelligent electronic device (IED) in an electric power delivery system, the IED configured to obtain electric power system operating parameters, the method comprising:
 continuously obtaining IED operating parameters of an IED related to operation of the IED at a first resolution having a first interval having a first time length, the IED configured to manage operation of a portion of an electric power delivery system; and
 storing the obtained IED operating parameters to provide stored IED operating parameters at the first resolution in independent memory for a life-time of the IED;
 deleting, outside a first resolution period, a first portion of the IED operating parameters while maintaining a second portion of the IED operating parameters, wherein the second portion comprises IED operating parameters for each second interval having a second time length to provide a reduced second resolution of the operation of the IED;
 identifying an IED event and to delete outside of a third interval portion of the IED operating parameters while maintaining the IED operating parameters for the third interval associated with the IED event, the third interval having a third time length;
 storing the IED operating parameters at the second resolution and the IED operating parameters for the third interval associated with the IED event.

15. The method of claim 14, wherein the first time length comprises about one millisecond and the second time length comprises about one second.

16. The method of claim 14, further comprising requesting IED operating parameters from the IED.

17. The method of claim 16, wherein requesting IED operating parameters comprises requesting via a communication interface.

18. The method of claim 17, wherein the communication interface comprises an ethernet connection.

19. The method of claim 14, wherein the IED operating parameters comprises an indicator indicating whether a parameter is within a predefined operating window.

20. The method of claim 19, wherein obtaining the IED operating parameters comprises comparing an IED operating parameter with the predefined operating window.

* * * * *